US012563433B2

(12) United States Patent
Polehn et al.

(10) Patent No.: US 12,563,433 B2
(45) Date of Patent: Feb. 24, 2026

(54) DYNAMIC REMOTE CONFIGURATION OF A RECONFIGURABLE INTELLIGENT SURFACES COMPONENT

(71) Applicant: Verizon Patent and Licensing Inc., Basking Ridge, NJ (US)

(72) Inventors: Donna L Polehn, Mercer Island, WA (US); Corey J Christopherson, Bainbridge Island, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 389 days.

(21) Appl. No.: 17/879,053

(22) Filed: Aug. 2, 2022

(65) Prior Publication Data

US 2024/0049026 A1     Feb. 8, 2024

(51) Int. Cl.
| | |
|---|---|
| *H04W 24/10* | (2009.01) |
| *H04B 17/336* | (2015.01) |
| *H04L 41/16* | (2022.01) |
| *H04W 28/04* | (2009.01) |

(52) U.S. Cl.
CPC .......... *H04W 24/10* (2013.01); *H04B 17/336* (2015.01); *H04L 41/16* (2013.01); *H04W 28/04* (2013.01)

(58) Field of Classification Search
CPC ..... H04W 24/10; H04W 28/04; H04W 24/02; H04B 17/336; H04L 41/16
See application file for complete search history.

(56) References Cited

U.S. PATENT DOCUMENTS

| | | | | |
|---|---|---|---|---|
| 2004/0039975 A1* | 2/2004 | Kounik | ................... | G06F 9/451 |
| | | | | 714/741 |
| 2019/0289541 A1* | 9/2019 | Fischer | .............. | H04W 52/346 |
| 2022/0014935 A1* | 1/2022 | Haija | .................... | H04L 5/0048 |
| 2023/0030324 A1* | 2/2023 | Ali | ..................... | H04B 7/04013 |
| 2023/0087862 A1* | 3/2023 | Dai | ...................... | H04B 7/0695 |
| | | | | 370/315 |
| 2023/0208683 A1* | 6/2023 | Kim | ...................... | H04W 24/02 |
| 2023/0246674 A1* | 8/2023 | Åström | ............. | H04B 7/04013 |
| | | | | 375/262 |
| 2023/0261708 A1* | 8/2023 | Jiang | ...................... | H04B 7/061 |
| | | | | 370/252 |
| 2023/0268650 A1* | 8/2023 | Swartz | ................... | H04B 7/043 |
| | | | | 455/411 |
| 2024/0031823 A1* | 1/2024 | Duan | .................... | G01S 13/765 |
| 2024/0137121 A1* | 4/2024 | Sun | ...................... | H04B 10/112 |

(Continued)

*Primary Examiner* — Christine Ng

(57) ABSTRACT

One or more computing devices, systems, and/or methods for dynamic remote configuration of a reconfigurable intelligent surfaces component are provided. A controller is hosted remote to a reconfigurable intelligent surfaces network, such as within a cloud computing environment. The controller receives characteristics (e.g., signal degradation information from a base station and/or user equipment) of signals transmitted through the reconfigurable intelligent surfaces network between devices. The controller evaluates the characteristics to generate tuning parameter values to apply to cells of the reconfigurable intelligent surfaces component of the reconfigurable intelligent surfaces network. The controller transmits a control signal over a communication channel to the reconfigurable intelligent surfaces component for modifying operation of the cells using the tuning parameter values.

20 Claims, 9 Drawing Sheets

(56)           References Cited

U.S. PATENT DOCUMENTS

| | | | |
|---|---|---|---|
| 2024/0137134 A1* | 4/2024 | Sahraei | H04B 17/12 |
| 2024/0171257 A1* | 5/2024 | Yoshioka | H04B 7/15528 |
| 2024/0204398 A1* | 6/2024 | Zhu | H01Q 3/005 |
| 2024/0236920 A1* | 7/2024 | Bao | G01S 5/0036 |
| 2024/0243795 A1* | 7/2024 | Hemadeh | H04B 7/0617 |
| 2024/0275432 A1* | 8/2024 | Ly | H04B 7/0617 |
| 2024/0413886 A1* | 12/2024 | Yoshioka | H04W 16/28 |

* cited by examiner

300

Figure 4:
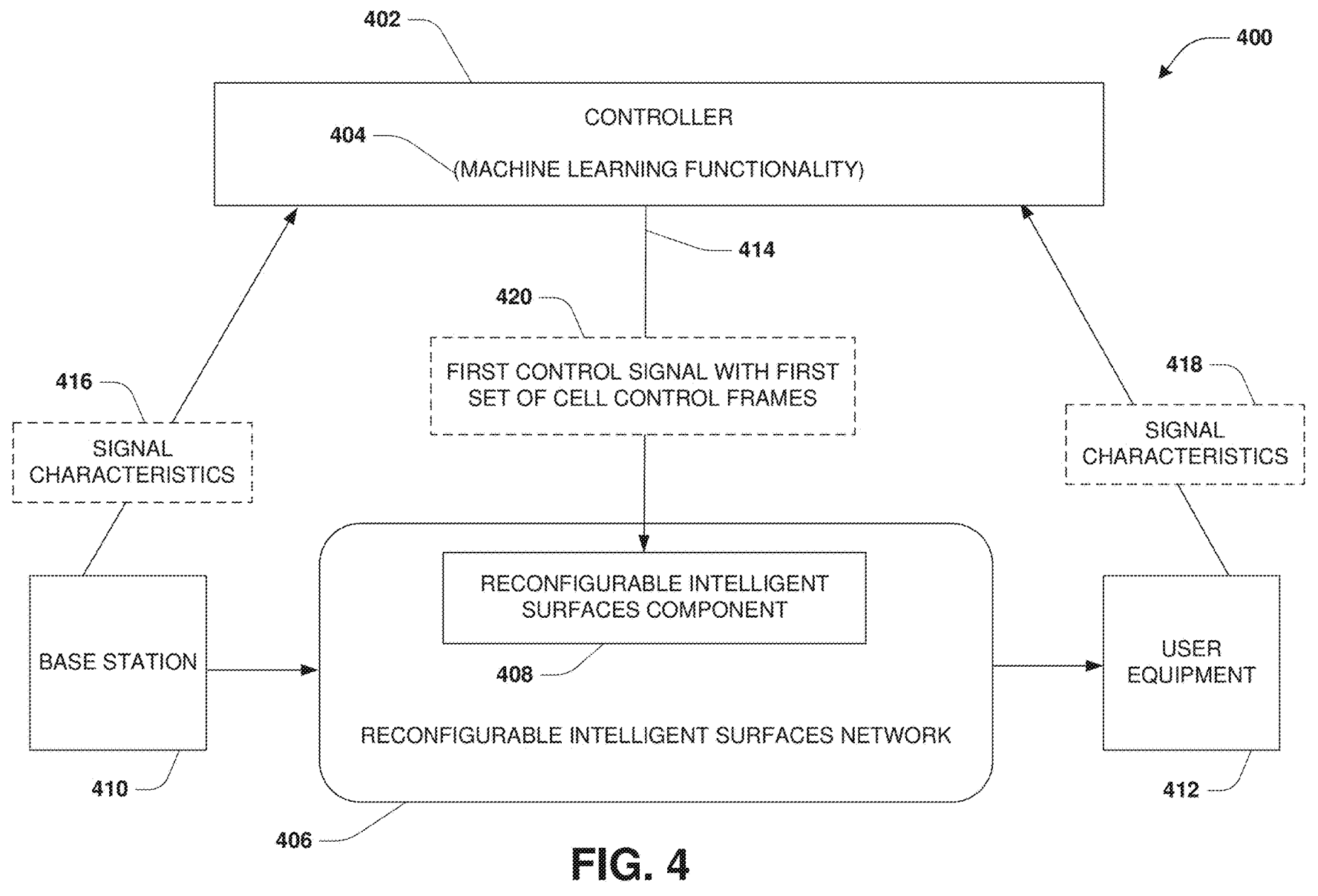

400

402 CONTROLLER 404 (MACHINE LEARNING FUNCTIONALITY)

414

420 FIRST CONTROL SIGNAL WITH FIRST SET OF CELL CONTROL FRAMES

418 SIGNAL CHARACTERISTICS

416 SIGNAL CHARACTERISTICS

406 RECONFIGURABLE INTELLIGENT SURFACES NETWORK

408 RECONFIGURABLE INTELLIGENT SURFACES COMPONENT

412 USER EQUIPMENT

410 BASE STATION

DYNAMIC REMOTE CONFIGURATION OF A RECONFIGURABLE INTELLIGENT SURFACES COMPONENT

BACKGROUND

Communication networks can utilize different frequency bands for facilitating communication between devices such as user equipment. For example, base stations may be deployed within a network that supports mid or low band frequencies that operate in the MHz to low GHz range. These base stations can provide communication coverage for kilometer range distances. However, these types of mid or low band frequency communication networks may have less capacity and/or speed, compared to other types of communication networks that utilize higher frequencies. In contrast, a communication network utilizing millimeter wave bands (e.g., 14 GHz or higher) can provide higher capacity, speed, and/or power, but at shorter ranges.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 4 is a diagram illustrating an example scenario associated with dynamic remote configuration of a reconfigurable intelligent surfaces component;

FIG. 5 is a diagram illustrating an example scenario associated with dynamic remote configuration of a reconfigurable intelligent surfaces component;

DETAILED DESCRIPTION OF EXAMPLE EMBODIMENTS

Figure 1:
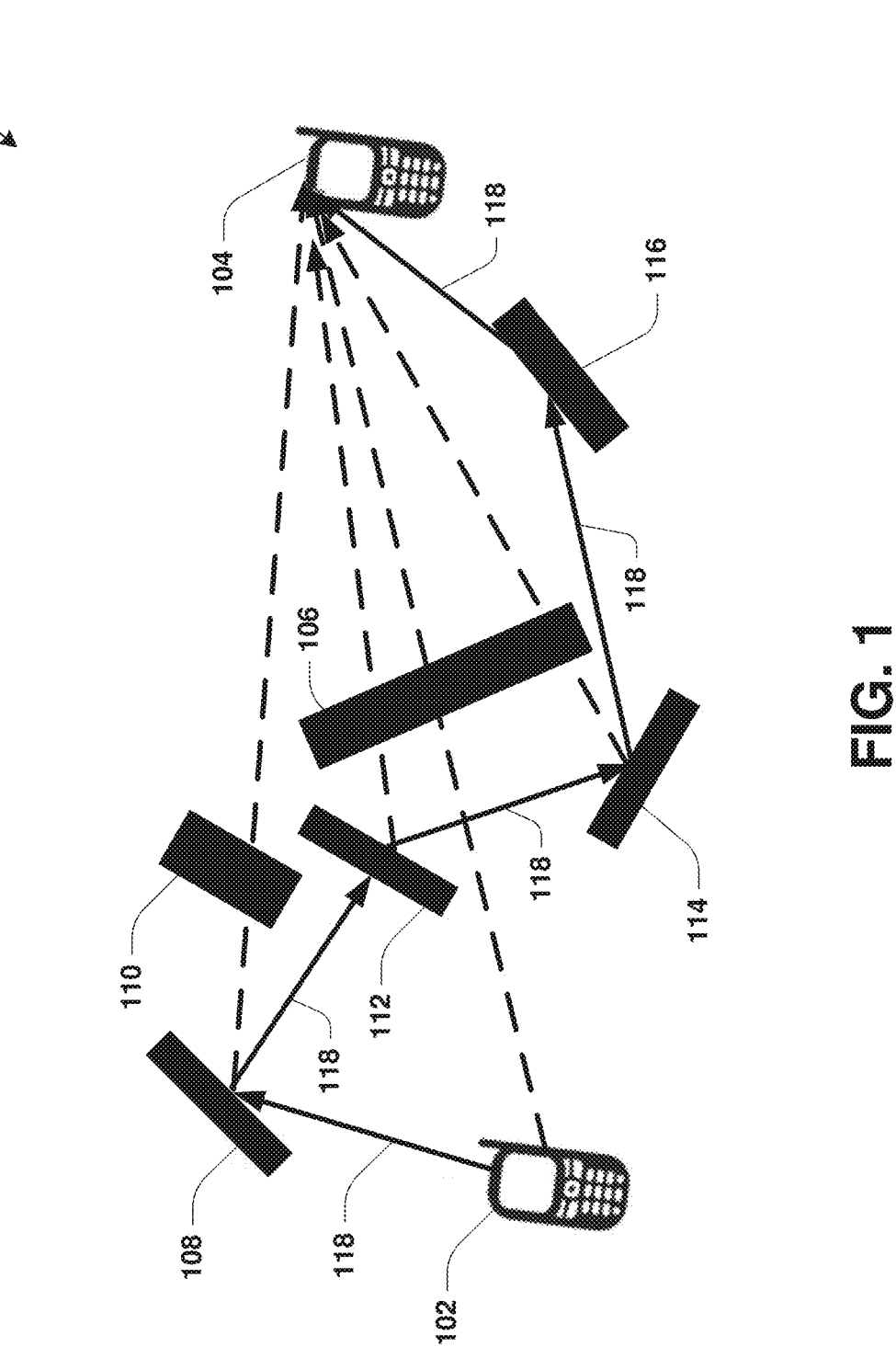
FIG. 1 is a diagram illustrating an example of a reconfigurable intelligent surfaces network.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for dynamic remote configuration of a reconfigurable intelligent surfaces component are provided. A wireless network may operate using millimeter wave frequency bands that provide user equipment with high speed communication and power over short distances. However, there may be high path loss at these higher frequencies (e.g., 14 GHz or greater), and thus there is a large drop off of power over distance. In order to address this issue, the wireless network may require a high cell site density of cells to propagate signals through the wireless network. This can become prohibitively expensive and impractical to deploy because power may significantly drop after 200 to 300 meters, and thus cells may need to be installed at locations that are 300 meters or less to one another. Repeaters can be installed in order to help address this distance limitation. However, the repeaters need adequate installation locations and surfaces, along with supplied power for operation. The power and installation requirements make repeaters a suboptimal solution that may not be scalable for large networks.

In order to address these limitations and constraints of certain types of wireless network such as millimeter wave band wireless networks, a reconfigurable intelligent surfaces network of reconfigurable intelligent surfaces components can be deployed for the wireless network. The reconfigurable intelligent surfaces network is deployed as low power or passive reflector type repeaters that reflect/propagate signals over the reconfigurable intelligent surfaces network of the wireless network. The reconfigurable intelligent surfaces components comprise cells that can be programmed/tuned using various voltage levels or other control signals into configurations and/or positions that will reflect/propagate signals through the reconfigurable intelligent surfaces network. The reconfigurable intelligent surfaces components can be easily camouflaged to the public, such as by being installed on billboards, the side of buildings, and/or painted to blend in with the location at which the reconfigurable intelligent surfaces components are installed. In this way, the reconfigurable intelligent surfaces components can be installed in a conformal arrangement on various surfaces and can be made to be effectively invisible to the public. Additionally, the reconfigurable intelligent surfaces components operate using less power than repeaters.

The techniques provided herein improve the operation of the reconfigurable intelligent surfaces components in a manner that reduces power consumption, simplifies the design and cost by eliminating the need for certain sub-components of the reconfigurable intelligent surfaces components, and enables the use of passive or near passive reconfigurable intelligent surfaces components that receive control signals and do not need to transmit information. Because certain sub-components can be excluded from a reconfigurable intelligent surfaces component (e.g., a sense radio, a transmitter, a microcontroller capable of processing information from the sense radio, etc.), the reconfigurable intelligent surfaces component consumes less power (e.g., operating using power supplied by solar cells, energy harvested from power of signals, a small battery, etc.), and has a more simple and cost effective design. Additionally, the reconfigurable intelligent surfaces component can be designed to be passive or near passive because the reconfigurable intelligent surfaces component does not need to transmit information to other devices, but instead receives control signals from a controller remote to the reconfigurable intelligent surfaces component. The control signals are used to control the reconfigurable intelligent surfaces component. The controller is implemented separate from the reconfigurable intelligent surfaces components, such as within a cloud computing environment, a server, a computing device, or other device.

The controller may implement functionality, such as machine learning functionality, to generate the control signals used by the reconfigurable intelligent surfaces component to configure cells for propagating signals through the reconfigurable intelligent surfaces network in a manner that improves a signal to noise and interference ratio and reduces signal degradation. The controller generates the control signals by using the machine learning functionality to evaluate signal characteristics of signals transmitted through the reconfigurable intelligent surfaces network between devices. It is the devices (e.g., a base station, user equipment, etc.) that provide the signal characteristics, and not the reconfigurable intelligent surfaces component. Thus, the reconfigurable intelligent surfaces component can be configured as a simple receive only device (a one-way communication device) that does not need additional hardware (e.g., sensing equipment, a transmitter, etc.) and/or processing functionality to collect and transmit information to the controller. Thus, the design complexity and power consumption of the reconfigurable intelligent surfaces component is greatly reduced such that the reconfigurable intelligent surfaces component can be designed as a passive or near passive device. The controller can iteratively generate control signals to dynamically configure the cells of the reconfigurable intelligent surfaces component based upon signal characteristics received over time from user devices in order to identify an optimal set of tuning parameter values for the cells.

FIG. 1 illustrates an example of a reconfigurable intelligent surfaces network 100. The reconfigurable intelligent surfaces network 100 includes reconfigurable intelligent surfaces components used to reflect/propagate signals from a first device 102 to a second device 104 (e.g., a base station, user equipment, a mobile device, a cellular device, a phone, equipment with wireless communication capabilities, etc.). For example, the reconfigurable intelligent surfaces network 100 comprises a first reconfigurable intelligent surfaces component 106, a second reconfigurable intelligent surfaces component 108, a third reconfigurable intelligent surfaces component 110, a fourth reconfigurable intelligent surfaces component 112, a fifth reconfigurable intelligent surfaces component 114, a sixth reconfigurable intelligent surfaces component 116, and/or other reconfigurable intelligent surfaces components.

The first device 102 may transmit a signal 118 towards the second reconfigurable intelligent surfaces component 108. The signal 118 may be a millimeter wave band, such as 14 GHz or higher. One or more cells of the second reconfigurable intelligent surfaces component 108 (e.g., radiating elements) may reflect the signal 118 towards the fourth reconfigurable intelligent surfaces component 112. One or more cells of the fourth reconfigurable intelligent surfaces component 112 may propagate the signal 118 (e.g., the signal 118 may radiate through the fourth reconfigurable intelligent surfaces component 112) towards the fifth reconfigurable intelligent sources component 114. One or more cells of the fifth reconfigurable intelligent sources component 114 may reflect the signal 118 towards the sixth reconfigurable intelligent surfaces component 116. One or more cells of the sixth reconfigurable intelligent surfaces component 116 may reflect the signal 118 to the second device 104. In this way, the signal 118 is transmitted through the reconfigurable intelligent surfaces network 100 from the first device 102 to the second device 104.

Figure 2:
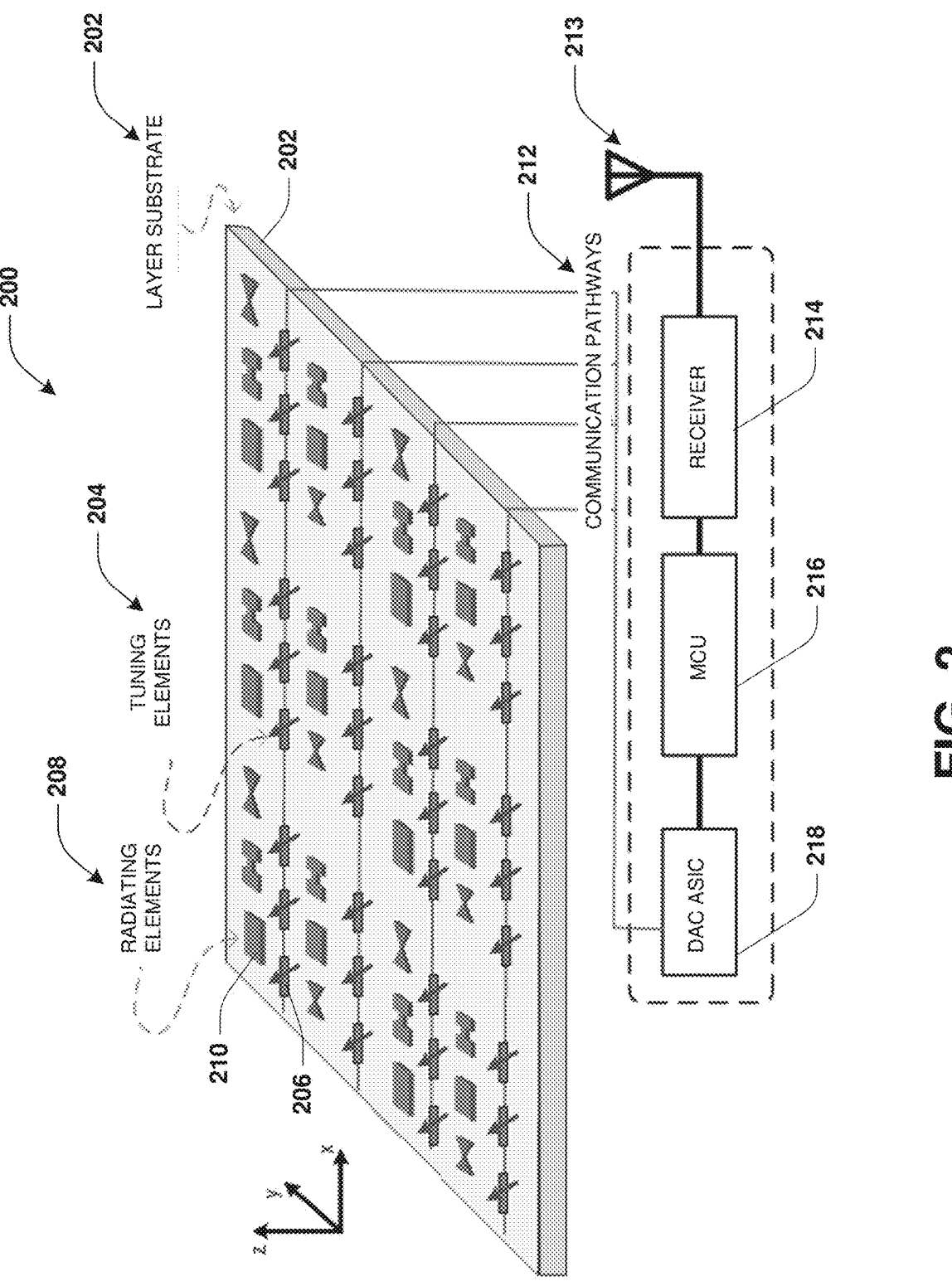
FIG. 2 is a diagram illustrating an example of a reconfigurable intelligent surfaces component.

FIG. 2 illustrates an example of a reconfigurable intelligent surfaces component 200. The reconfigurable intelligent surfaces component 200 comprises a layer substrate 202 on which cells are formed. The cells may include radiating elements 208 such as radiating element 210 that are tuned and controlled by tuning elements such as tuning element 206. In an example of controlling the radiating element 210, the tuning element 206 may apply a particular voltage level to the radiating element 210 in order to configure how the radiating element 210 may reflect/propagate a signal, such as by configuring an orientation and position of the radiating element 210.

The reconfigurable intelligent surfaces component 200 may comprise a receiver 214 configured to receive control signals over a communication channel 213 from a controller that is located remote to the reconfigurable intelligent surfaces component 200. The controller may be hosted by a remote server, computing device, cloud computing environment, etc. The controller may implement functionality used to generate the control signals based upon signal characteristics of signal transmitting by the reconfigurable intelligent surfaces component 200 through a reconfigurable intelligent surfaces network. The control signals may specify voltage levels that are to be applied by the tuning elements 204 to the radiating elements 208 (cells).

The signal characteristics may be provided to the controller by base stations, user equipment, or other devices than the reconfigurable intelligent surfaces component 200. In this way, the reconfigurable intelligent surfaces component 200 can be optionally designed as a receive only passive or semi passive device without a transmitter, in some embodiments. This is because the reconfigurable intelligent surfaces component 200 does not need to send information to the controller because the controller receives the signal characteristics from other devices. The reconfigurable intelligent surfaces component 200 may optionally comprise a microcontroller 216 used to process the control signals received by the receiver 214. The reconfigurable intelligent surfaces component 200 may comprise a digital to analog (DAC) converter circuit 218 used to control the tuning of the radiating elements 208 (cells) such as by transmitting the voltage level values over communication paths 212 to the tuning elements 204.

In some embodiments, the microcontroller 216 is optional because the reconfigurable intelligent surfaces component 200 is not required to perform complex computations to determine what voltage levels to apply to cells. This is because the voltage levels are calculated by the controller and provided by the controller to the reconfigurable intelligent surfaces component 200 through the control signals. Additionally, the reconfigurable intelligent surfaces component 200 does not require a transceiver for providing information to the controller because the controller obtains such information (e.g., signal characteristics) from other devices such as base stations and user equipment. Because the reconfigurable intelligent surfaces component 200 does not need to provide information to the controller, the reconfigurable intelligent surfaces component 200 does not need to include a sensing radio used to collect signal characteristics and reconfigure the radiating elements 208 (cells) based upon the signal characteristics. In this way, the reconfigurable intelligent surfaces component 200 can be designed as a simple, low cost, and low powered device because the controller is performing the resource intensive computations of how to configure the radiating elements 208 (cells) of the reconfigurable intelligent surfaces component 200.

Figure 3:
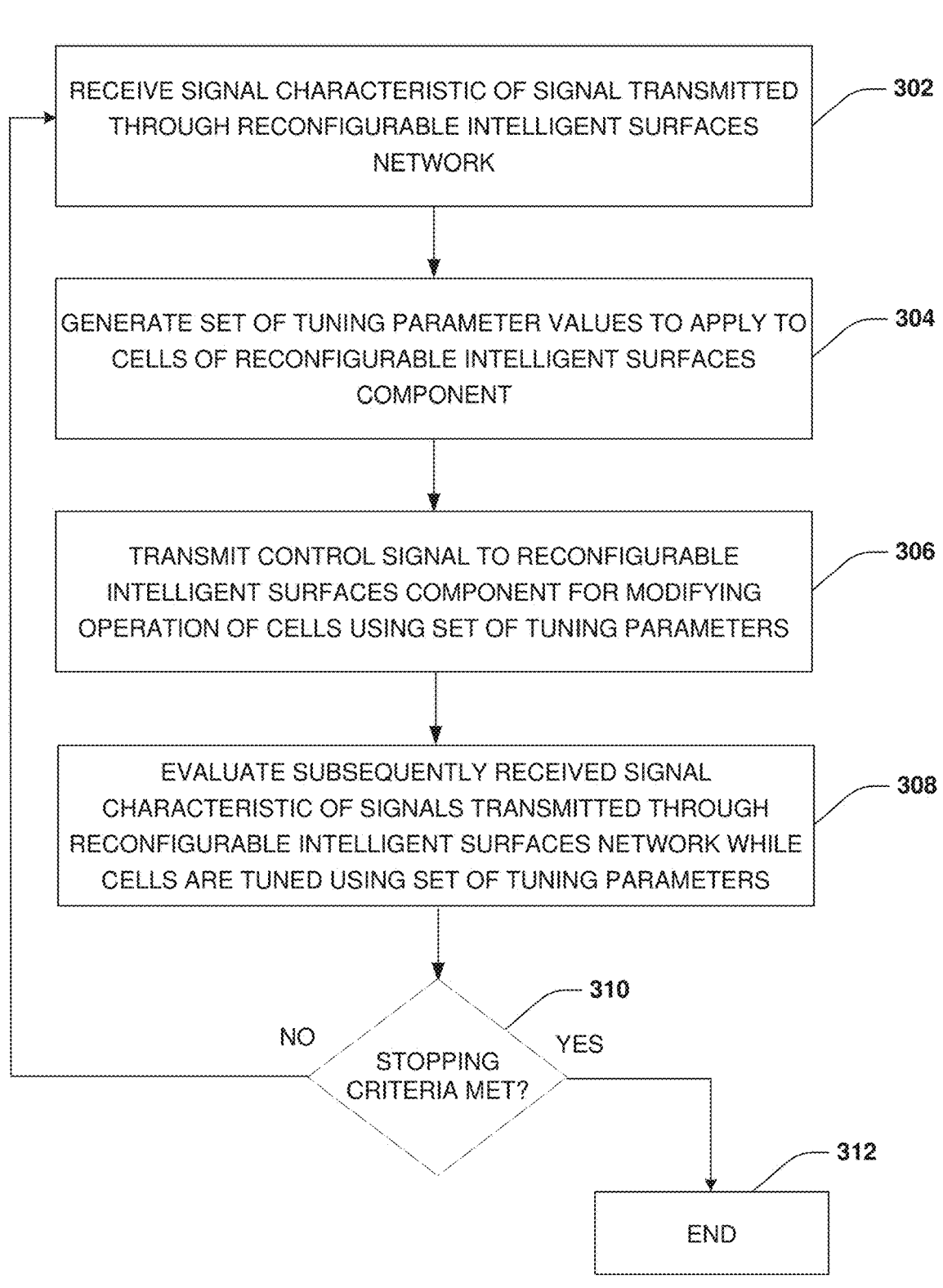
FIG. 3 is a flow chart illustrating an example method for dynamic remote configuration of a reconfigurable intelligent surfaces component.
Figure 5:
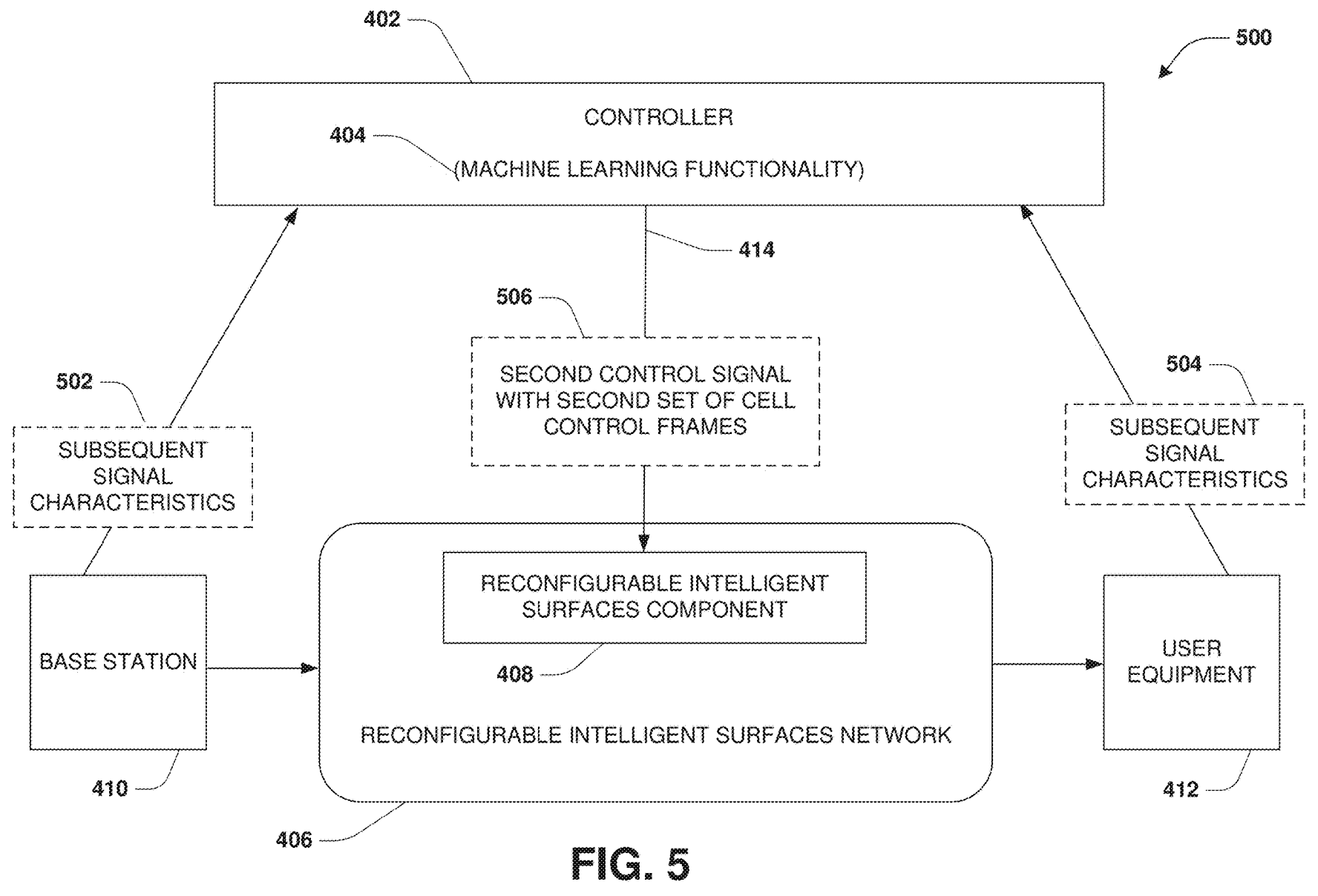

FIG. 3 illustrates an example of a method 300 for dynamic remote configuration of a reconfigurable intelligent surfaces component, which is further described in conjunction with the system 400 of FIG. 4 and system 500 of FIG. 5. A reconfigurable intelligent surfaces network 406 may be part of a wireless network used to transmit signals between devices of the wireless network. In some embodiments, the wireless network may support transmission of millimeter wave band signals that provide high signal speed and power over certain distances (e.g., distances of 300 meters or less).

The reconfigurable intelligent surfaces network 406 may comprise one or more reconfigurable intelligent surfaces components with cells (radiating elements) that reflect/propagate signals through the reconfigurable intelligent surfaces network 406. For example, a reconfigurable intelligent surfaces component 408 may comprise a plurality of cells configured to operate based upon tuning parameter values such as voltage levels used to control the cells. Depending on a voltage level (or impedance) applied to a cell, the cell may be oriented in a particular orientation for reflecting/propagating a signal impinging the cell. The reconfigurable intelligent surfaces component 408 may comprise a receiver configured to receive control signals over a communication channel 414, such as a wireless communication channel, from a controller 402 remote to the reconfigurable intelligent surfaces component 408. The control signals may comprise tuning parameter values that a tuning component of the reconfigurable intelligent surfaces component 408 applies to the plurality of cells to modify operation of the plurality of cells (e.g., modify an orientation or other parameters that affects how a cell reflects/propagates a signal). In this way, the plurality of cells are configured to propagate signals over the reconfigurable intelligent surfaces network 406 between devices, such as between a base station 410 and user equipment 412.

In some embodiments, the reconfigurable intelligent surfaces component 408 is configured as a one-way communication device with a receiver configured to receive the control signals from the controller 402 over the communication channel 414. In some embodiments, the communication channel 414 is implemented as a receive only radio link where the reconfigurable intelligent surfaces component 408 receives signals such as the control signals over the receive only radio link and the reconfigurable intelligent surfaces component 408 does not send signals to the controller 402 over the receive only radio link.

The controller 402 is hosted on a device separate from the reconfigurable intelligent surfaces component 408, such as within a cloud computing environment separate from the reconfigurable intelligent surfaces network 406. In this way, the controller 402 may have access to computing resources capable of executing machine learning functionality 404 and/or other processing functionality for generating control signals to control operation of the reconfigurable intelligent surfaces component 408. Such processing can be offloaded from the reconfigurable intelligent surfaces component 408 to the controller 402 so that the reconfigurable intelligent surfaces component 408 can be designed as a simple, low cost, and low power component that does not require extensive processing power and other resources needed to evaluate signals, estimate channel conditions of the signals being propagated through the reconfigurable intelligent surfaces network 406, and determine how to adjust/tune the plurality of cells for improved or desired performance and signal to interference and noise ratio.

In some embodiments, the controller 402 may utilize an initial tuning seed, such as an estimation, used by the machine learning functionality to create a set of initial tuning parameter values based upon the initial tuning seed. The initial tuning seed may be used to create the set of initial tuning parameter values because the controller 402 may initially lack information relating to signal characteristics (e.g., signal degradation) of signals propagating through the reconfigurable intelligent surfaces network 406. The controller 402 may transmit a control signal over the communication channel 414 to the reconfigurable intelligent surfaces component 408 for modifying operation of the plurality of cells using the set of initial tuning parameter values.

As devices communicate over the reconfigurable intelligent surfaces network 406, the controller 402 may receive information that can be used as input into the machine learning functionality 404 for generating new turning parameter values for controlling the plurality of cells of the reconfigurable intelligent surfaces component 408. In some embodiments, the controller 402 may receive signal characteristics 416 from the base station 410. The signal characteristics 416 may indicate signal strength and/or other characteristics of signals transmitted by the base station 410 over the reconfigurable intelligent surfaces network 406. In some embodiments, the controller 402 may receive signal characteristics 418 from the user equipment 412. The signal characteristics 418 may indicate signal strength, degradation, and/or other characteristics of signals received by the user equipment 412 over the reconfigurable intelligent surfaces network 406. In this way, the controller 402 receives signal characteristics of signal transmitted through the reconfigurable intelligent surfaces network 406 between devices, during operation 302 of method 300.

During operation 304 of method 300, the controller 402 may execute the machine learning functionality 404 or other functionality to evaluate the signal characteristics 416 from the base station 410 and/or the signal characteristics from the user equipment 412 in order to generate a first set of tuning parameter values to apply to the plurality of cells of the reconfigurable intelligent surfaces component 408 for modifying operation the plurality of cells. The first set of tuning parameter values may comprise voltage values that can be used to tune cells (radiating elements) of the reconfigurable intelligent surfaces component 408 in order to change how the reconfigurable intelligent surfaces component 408 reflects/propagates signals through the reconfigurable intelligent surfaces network 406. In some embodiments, the machine learning functionality 404 may select the voltage values in order to configure/orient the plurality of cells in a manner that will propagate signals with increased signal to interface and noise ratio, thus improving performance of the reconfigurable intelligent surfaces network 406 and signal strength of the signals transmitted through the reconfigurable intelligent surfaces network 406.

During operation 306 of method 300, the controller 402 generates and transmits a first control signal 420 to the reconfigurable intelligent surfaces component 408. The first control signal 420 may be transmitted from the controller 402 over the communication channel 414 to the reconfigurable intelligent surfaces component 408. The first control signal 420 comprises the first set of tuning parameter values, such as the voltage values to apply to the plurality of cells of the reconfigurable intelligent surfaces component 408 for modifying operation of the plurality of cells. In some embodiments, the first control signal 420 is broadcast over the communication channel 414 such that the first control signal 420 could be received by any reconfigurable intelligent surfaces component of the reconfigurable intelligent surfaces network 406 or other device connected to the communication channel 414. Accordingly, the first control signal 420 may comprise an identifier of a target reconfigurable intelligent surfaces component that is to receive and process the first control signal 420, such as the reconfigurable intelligent surfaces component 408.

In some embodiments, the first control signal 420 comprises a plurality of cell control frames associated with the plurality of cells of the reconfigurable intelligent surfaces component 408. A first cell control frame of the first control signal 420 may comprise an identifier of the reconfigurable intelligent surfaces component 408, a first cell identifier (e.g., x,y coordinates, a sequentially increasing value per cell, etc.) of a first cell that is to be configured/tuned, a first voltage level with which the first cell is to be tuned, and/or first error detection and correction information that can be used by the reconfigurable intelligent surfaces component 408 to validate the first cell control frame. A second cell control frame of the first control signal 420 may comprise the identifier of the reconfigurable intelligent surfaces component 408, a second cell identifier of a second cell that is to be configured/tuned, a second voltage level with which the second cell is to be tuned, and/or second error detection and correction information that can be used by the reconfigurable intelligent surfaces component 408 to validate the second cell control frame. In this way, the first control signal 420 may comprise any number of cell control frames.

The first control signal 420 may be received by the receiver of the reconfigurable intelligent surfaces component 408. The reconfigurable intelligent surfaces component 408 may read each cell control frame, and apply a voltage level specified by a cell control frame to a corresponding cell identified by the cell control frame. In this way, the voltage levels within the first control signal 420 are applied to the plurality of cells in order to modify operation of the plurality of cells, such as adjusting orientations and/or other properties of the plurality of cells for propagating signals through the reconfigurable intelligent surfaces network 406 differently than before the voltage levels were applied.

The controller 402 may iteratively generate new tuning parameter values and transmit new control signals to the reconfigurable intelligent surfaces component 408 over time in order to iteratively adjust operation of the reconfigurable intelligent surfaces component 408. This may be performed in order to identify a desired or optimal configuration for the plurality of cells that provides desired or optimal performance and signal to interface and noise ratio for signals transmitted through the reconfigurable intelligent surfaces network 406. In some embodiments, the controller may iteratively generate new tuning parameter values and transmit new control signals to the reconfigurable intelligent surfaces component 408 until a stopping criteria is satisfied. In some embodiments, the stopping criteria corresponds to a determination that an increase in performance by the reconfigurable intelligent surfaces component 408 from a prior iteration to a next iteration of configuring the reconfigurable intelligent surfaces component 408 is below a threshold. That is, if there is little to no increase in performance (or there is a decrease in performance) after adjusting voltage levels for the plurality of cells of the reconfigurable intelligent surfaces component 408, then the plurality of cells may be optimally configured and no further tuning/configuration is necessary. Because environmental variables can change over time and affect performance (e.g., weather, construction of a new building, movement of devices or objects, etc.), the controller 402 may resume iteratively generating new tuning parameter values and transmitting new control signals to the reconfigurable intelligent surfaces component 408 after a certain amount of time (e.g., a few hours, a day, a week, etc.). This may be performed to see if any additional tuning will improve performance of the reconfigurable intelligent surfaces component 408.

After the first control signal 420 is used to tune the plurality of cells of the reconfigurable intelligent surfaces component 408, subsequently received signal characteristics of signals transmitted through the reconfigurable intelligent surfaces network 406 while the cells are turned using the first set of tuning parameter values are evaluated by the controller 402, during operation 308 of method 300. For example, the controller 402 may subsequently receive signal characteristics 502 from the base station 410 and signal characteristics 504 from the user equipment 412, as illustrated by FIG. 5. The signal characteristics 502 and the signal characteristics 504 may relate to signals transmitted through the reconfigurable intelligent surfaces network 406 while the plurality of cells are turned using the first set of tuning parameter values from the first control signal 420.

The controller 402 may utilize the machine learning functionality to process the signal characteristics 502 and the signal characteristics 504 in order to generate a second set of tuning parameter values. The controller 402 may generate and transmit a second control signal 506 of the second set of tuning parameter values (e.g., voltage levels) to the reconfigurable intelligent surfaces component 408 for applying the second set of tuning parameter values to the plurality of cells. The second control signal 506 may comprise a second set of cell control frames, where each cell control frame includes the identifier of the reconfigurable intelligent surfaces component 408, a cell identifier of a cell that is to be configured/tuned, a voltage level with which the cell is to be tuned, and/or first error detection and correction information that can be used by the reconfigurable intelligent surfaces component 408 to validate the cell control frame. In this way, the controller 402 iteratively generates new tuning parameter values and transmits new control signals to the reconfigurable intelligent surfaces component 408 until the stopping criteria is met.

During operation 310 of method 300, a determination is made as to whether the stopping criteria is met. If the stopping criteria has not been met (e.g., performance is improving by a threshold amount with each iteration), then the controller 402 continues to iteratively generate new tuning parameter values and transmit new control signals to the reconfigurable intelligent surfaces component 408. If the stopping criteria has been met (e.g., performance decreased or is not improving by the threshold amount with each iteration), then the controller 402 may terminate execution, during operation 312 of method 300.

In some embodiments, the stopping criteria may be met due to a local optimization peak that is not the actual optimized tuning parameter values of voltage levels providing optimized performance. Accordingly, the controller 402 may store a set of current tuning parameter values as stored tuning parameter values based upon the stopping criteria being satisfied. The stored tuning parameter values can be reverted back to if further attempted tuning parameter values do not increase performance. The controller 402 may generate a new set of tuning parameter values based upon a seed value input into the machine learning functionality 404. The controller 402 may transmit a new control signal over the communication channel 414 to the reconfigurable intelligent surfaces component 408 for modifying operation of the plurality of cells using the new set of tuning parameter values.

The controller 402 may receive updated signal characteristics corresponding to signals transmitted through the reconfigurable intelligent surfaces network 406 while the plurality of cells are tuned using the new set of tuning parameter values. The controller 402 may evaluate the updated signal characteristics to determine an updated performance of the reconfigurable intelligent surfaces component 408. If the updated performance is less than the performance of the reconfigurable intelligent surfaces component 408 while configured using the stored tuning parameter values, then the controller 402 may revert back to controlling the plurality of cells using the stored tuning parameter values (e.g., there was no local optimized peak). The controller 402 sends a control signal to the reconfigurable intelligent surfaces component 408 for modifying operation of the plurality of cells using the stored tuning parameter values. If the updated performance is greater than the performance of the reconfigurable intelligent surfaces component 408 while configured using the stored tuning parameter values (e.g., there was a local optimized peak), then the controller 402 may delete the stored tuning parameter values and retain the new set of tuning parameter values for controlling the plurality of cells and/or for performing additional iterations of generating additional new tuning parameter values and/or control signals.

Figure 6:
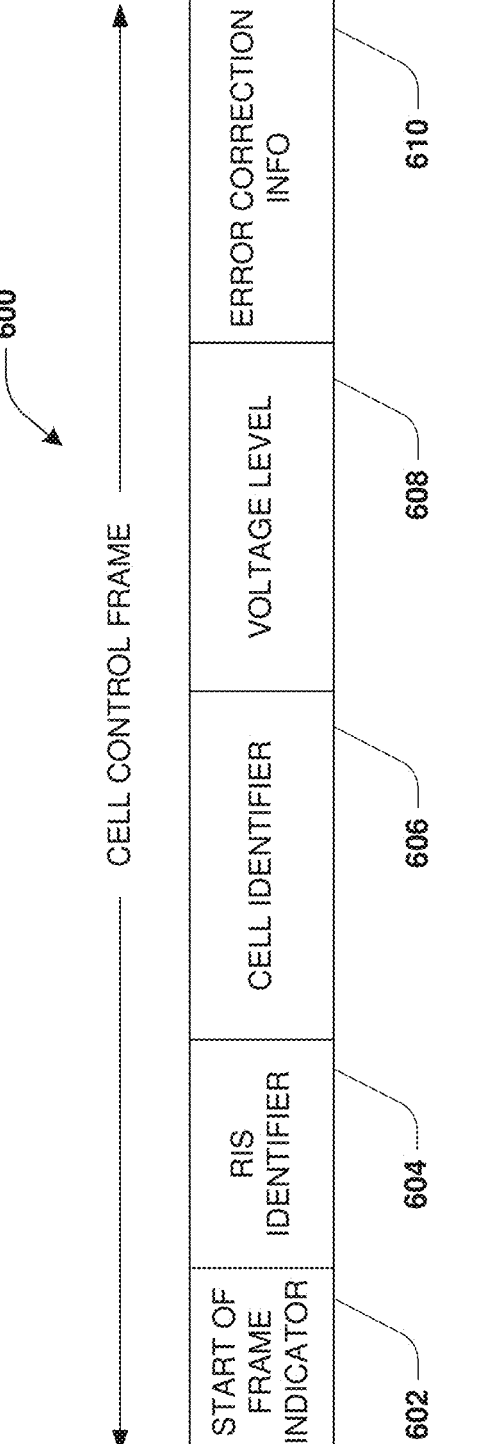
FIG. 6 is a diagram illustrating an example of a cell control frame.

FIG. 6 illustrates an example of a cell control frame 600 of a control signal generated by the controller 402 for controlling a cell of the reconfigurable intelligent surfaces component 408. The cell control frame 600 comprises a start of frame indicator 602. Because the control signal may comprise a plurality of cell control frames, the start of frame indicator 602 provides the reconfigurable intelligent surfaces component 408 with an indication that a new cell control frame is being defined through the control signal. The start of frame indicator 602 may be a uniquely identifiable bit pattern. The cell control frame 600 may comprise an identifier 604 of the reconfigurable intelligent surfaces component 408. Because the controller broadcasts the control signal such that any reconfigurable intelligent surfaces component can receive the control signal, the identifier 604 is used by the reconfigurable intelligent surfaces components to identify which reconfigurable intelligent surfaces component is to process the control signal. In some embodiments, the identifier 604 comprises a MAC address or serial number (e.g., a 16 bit serial number). The cell control frame 600 may comprise a cell identifier 606 of a cell to tune (e.g., x,y coordinates or a sequentially increasing value per cell). The cell control frame 600 may comprise a voltage level 608 corresponding to a tuning parameter value to apply to the cell (e.g., a voltage applied to an active component such as a varactor to obtain a specific impedance/reactive for that cell). The cell control frame 600 may comprise error detection and correction information 610 (e.g., Cyclic Redundancy Checks or Forward Error Correction information) that can be used by the reconfigurable intelligent surfaces component 408 to detect and/or correct any errors within the cell control frame 600.

According to some embodiments, a method may be provided. The method includes receiving, by a controller remote to a reconfigurable intelligent surfaces network, characteristics of signals transmitted through the reconfigurable intelligent surfaces network between devices; evaluating, by the controller, the characteristics to generate tuning parameter values to apply to cells of a reconfigurable intelligent surfaces component of the reconfigurable intelligent surfaces network; and transmitting, by the controller, control signals over a communication channel to the reconfigurable intelligent surfaces component for modifying operation of the cells using the tuning parameter values.

According to some embodiments, the control signal comprises a plurality of cell control frames, wherein a cell control frame comprises an identifier of the reconfigurable intelligent surfaces component, a voltage level as a tuning parameter value, and a cell identifier of a cell that is to be programmed with the voltage level.

According to some embodiments, the method comprising iteratively generating new tuning parameter values and transmitting new control signals to the reconfigurable intelligent surfaces component until a stopping criteria is satisfied, wherein the stopping criteria corresponds to a determination that an increase in performance by the reconfigurable intelligent surfaces component from a prior iteration to a next iteration of new control signals is below a threshold.

According to some embodiments, the method includes iteratively generating new tuning parameter values and transmitting new control signals to the reconfigurable intelligent surfaces component until a stopping criteria is satisfied, wherein in response to the stopping criteria being satisfied, storing a set of current tuning parameter values as stored tuning parameter values; generating a new set of tuning parameter values based upon a seed value; and transmitting a new control signal over the communication channel to the reconfigurable intelligent surfaces component for modifying operation of the cells using the new set of tuning parameter values.

According to some embodiments, the method includes receiving updated characteristics corresponding to a signal transmitted through the reconfigurable intelligent surfaces network while the cells are tuned using the new set of tuning parameter values; evaluating the updated characteristics to determine an updated performance of the reconfigurable intelligent surfaces component; and in response to the updated performance being less than the performance of the reconfigurable intelligent surfaces component while the cells were tuned using the stored tuning parameter values, transmitting a control signal over the communication channel to the reconfigurable intelligent surfaces component for modifying operation of the cells using the stored tuning parameter values.

According to some embodiments, the controller is hosted within a cloud computing environment separate from the reconfigurable intelligent surfaces network, and wherein a first device is a base station and a second device is user equipment.

According to some embodiments, the controller evaluates a set of signal characteristics received from at least one of the base station or the user equipment using machine learning to generate a set of tuning parameter values as voltage levels to apply to the cells of the reconfigurable intelligent surfaces component.

According to some embodiments, a control signal is broadcast over the communication channel, and wherein the control signal comprises a plurality of cell control frames associated with a plurality of cells of the reconfigurable intelligent surfaces component.

According to some embodiments, a cell control frame comprises an identifier of the reconfigurable intelligent surfaces component and a voltage level as a tuning parameter value.

According to some embodiments, the cell control frame comprises a cell identifier of a cell that is to be programmed with the voltage level.

According to some embodiments, a cell control frame comprises error detection and correction information used by the reconfigurable intelligent surfaces component to validate the cell control frame.

According to some embodiments, the method includes generating a tuning parameter value to apply to a cell for increasing a signal to interference and noise ratio.

According to some embodiments, the method includes generating an initial tuning seed; creating a set of initial tuning parameter values based upon the initial tuning seed; and transmitting a control signal to the reconfigurable intelligent surfaces component for modifying operation of the cells using the set of initial tuning parameter values.

According to some embodiments, a system is provided. The system comprises a reconfigurable intelligent surfaces component comprising a plurality of cells configured to operate based upon tuning parameter values. The reconfigurable intelligent surfaces component comprises a receiver configured to receive a control signal over a wireless communication channel from a controller remote to the reconfigurable intelligent surfaces component. The control signal comprises a set of tuning parameter values generated by the controller utilizing machine learning functionality. The reconfigurable intelligent surfaces component comprises a tuning component configured to apply the set of tuning parameter values to the plurality of cells to modify operation of the plurality of cells.

According to some embodiments, the reconfigurable intelligent surfaces component is configured as a one-way communication device that uses the receiver to receive control signals from the controller over the communication channel implemented as a receive only radio link.

According to some embodiments, the control signal comprises a plurality of cell control frames, wherein a cell control frame comprises an identifier of the reconfigurable intelligent surfaces component, a voltage level as a tuning parameter value, and a cell identifier of a cell that is to be programmed with the voltage level.

According to some embodiments, the tuning component validates the cell control frame using error detection and correction information within the cell control frame.

According to some embodiments, the tuning component programs the plurality of cells with voltage values specified by the set of tuning parameter values identified by the machine learning functionality of the controller.

According to some embodiments, the plurality of cells are configured to propagate a signal from a base station to user equipment over a reconfigurable intelligent surfaces network.

According to some embodiments, a non-transitory computer-readable medium storing instructions that when executed facilitate performance of operations, is provided. The operations include receiving, by a controller remote to a reconfigurable intelligent surfaces network, signal characteristics of signals transmitted through the reconfigurable intelligent surfaces network between devices. The operations include evaluating, by the controller, the signal characteristics to generate tuning parameter values to apply to cells of a reconfigurable intelligent surfaces component of the reconfigurable intelligent surfaces network. The operations include transmitting, by the controller, a plurality of cell control frames over a communication channel to the reconfigurable intelligent surfaces component for modifying operation of the cells using the tuning parameter values.

Figure 7:
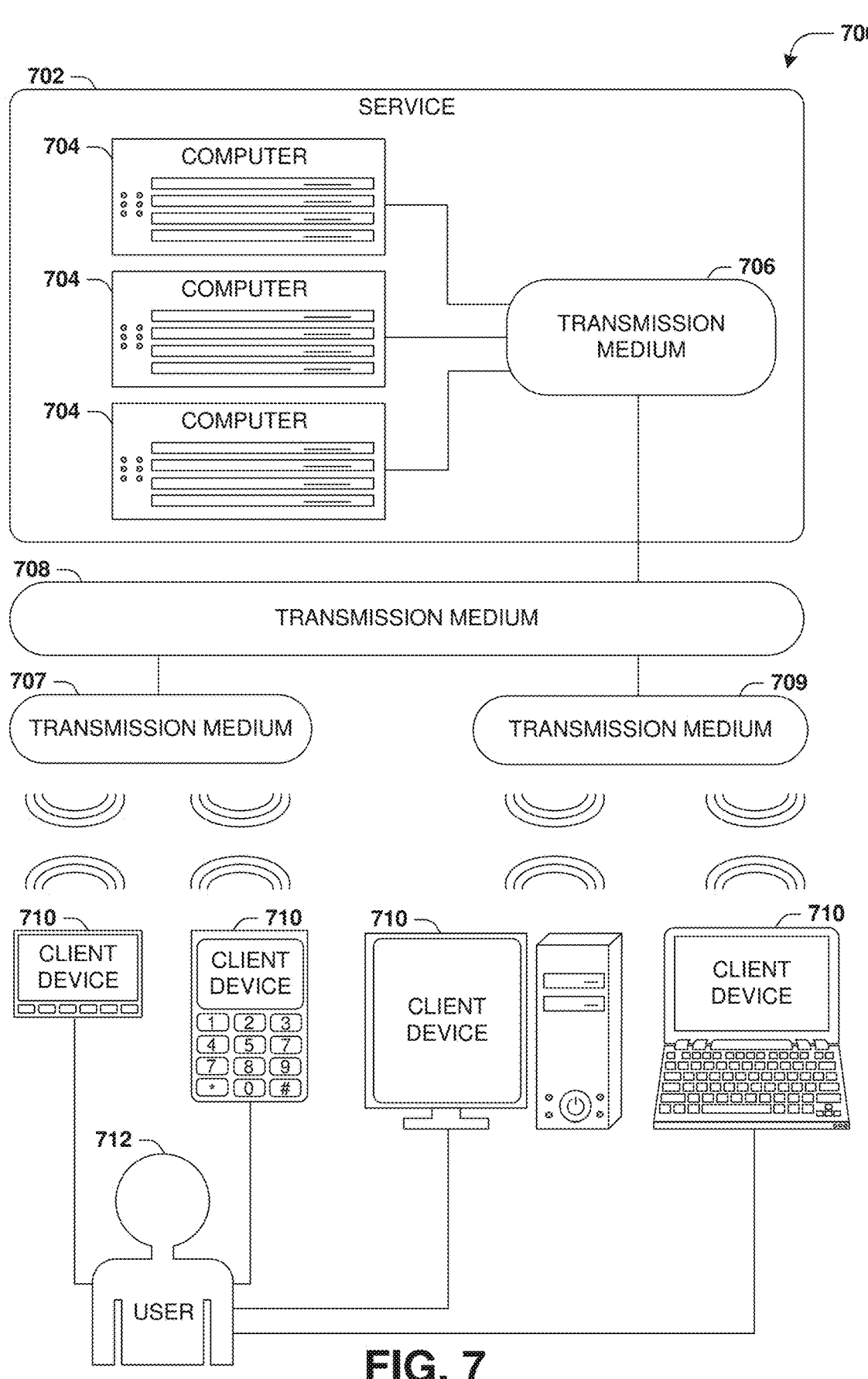
FIG. 7 is an illustration of example networks that may utilize and/or implement at least a portion of the techniques presented herein.

FIG. 7 is an interaction diagram of a scenario 700 illustrating a service 702 provided by a set of computers 704 to a set of client devices 710 via various types of transmission mediums. The computers 704 and/or client devices 710 may be capable of transmitting, receiving, processing, and/or storing many types of signals, such as in memory as physical memory states.

The computers 704 of the service 702 may be communicatively coupled together, such as for exchange of communications using a transmission medium 706. The transmission medium 706 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 702.

Likewise, the transmission medium 706 may comprise one or more sub-networks, such as may employ different architectures, may be compliant or compatible with differing protocols and/or may interoperate within the transmission medium 706. Additionally, various types of transmission medium 706 may be interconnected (e.g., a router may provide a link between otherwise separate and independent transmission medium 706).

In scenario 700 of FIG. 7, the transmission medium 706 of the service 702 is connected to a transmission medium 708 that allows the service 702 to exchange data with other services 702 and/or client devices 710. The transmission medium 708 may encompass various combinations of devices with varying levels of distribution and exposure, such as a public wide-area network and/or a private network (e.g., a virtual private network (VPN) of a distributed enterprise).

In the scenario 700 of FIG. 7, the service 702 may be accessed via the transmission medium 708 by a user 712 of one or more client devices 710, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 710 may communicate with the service 702 via various communicative couplings to the transmission medium 708. As a first such example, one or more client devices 710 may comprise a cellular communicator and may communicate with the service 702 by connecting to the transmission medium 708 via a transmission medium 707 provided by a cellular provider. As a second such example, one or more client devices 710 may communicate with the service 702 by connecting to the transmission medium 708 via a transmission medium 709 provided by a location such as the user's home or workplace (e.g., a WiFi (Institute of Electrical and Electronics Engineers (IEEE) Standard 702.11) network or a Bluetooth (IEEE Standard 702.15.1) personal area network). In this manner, the computers 704 and the client devices 710 may communicate over various types of transmission mediums.

Figures 8, 9:
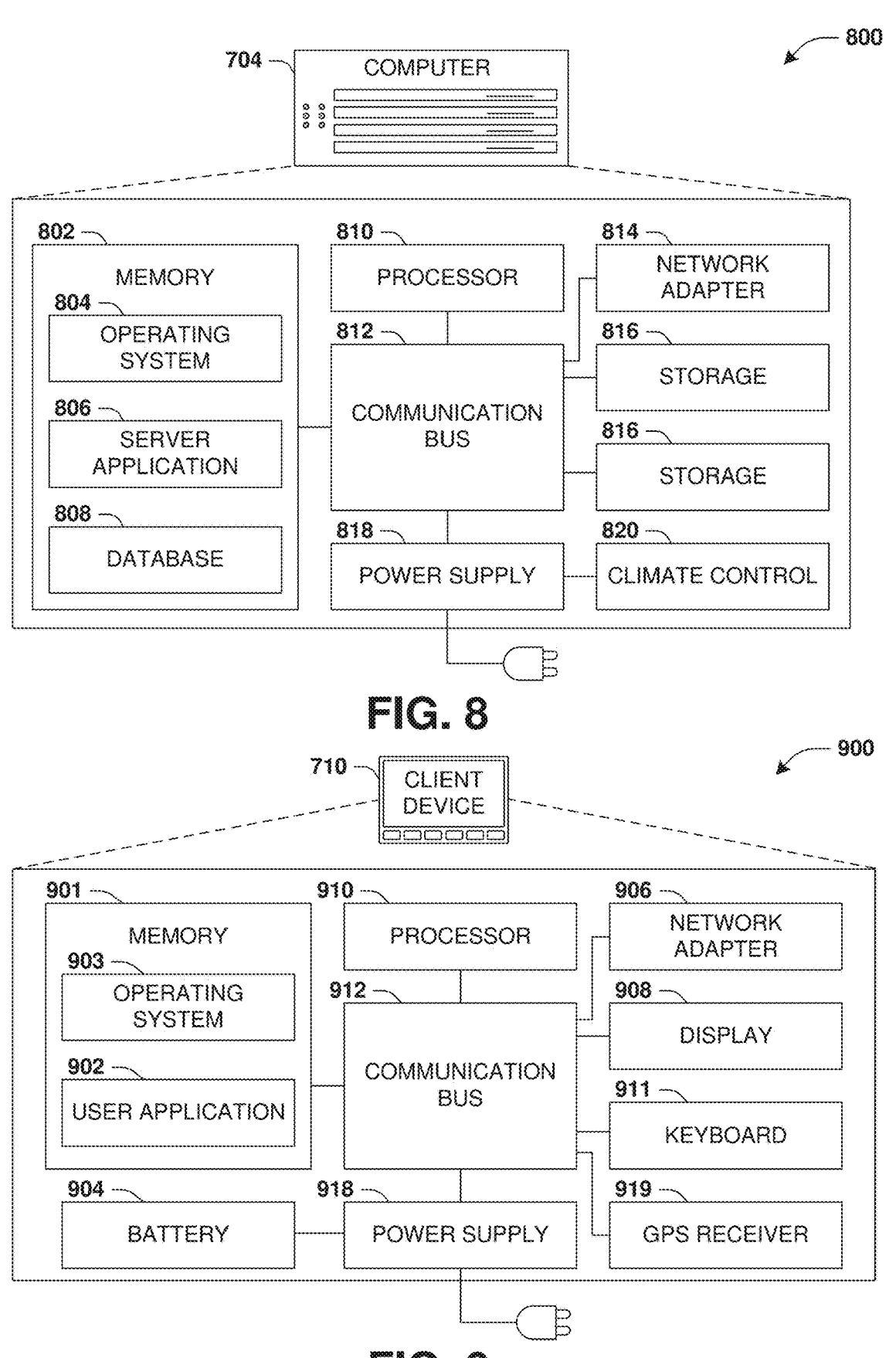
FIG. 8 is an illustration of a scenario involving an example configuration of a computer that may utilize and/or implement at least a portion of the techniques presented herein.
FIG. 9 is an illustration of a scenario involving an example configuration of a client that may utilize and/or implement at least a portion of the techniques presented herein.

FIG. 8 presents a schematic architecture diagram 800 of a computer 704 that may utilize at least a portion of the techniques provided herein. Such a computer 704 may vary widely in configuration or capabilities, alone or in conjunction with other computers, in order to provide a service such as the service 702.

The computer 704 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The computer 704 may comprise memory 802 storing various forms of applications, such as an operating system 804; one or more computer applications 806; and/or various forms of data, such as a database 808 or a file system. The computer 704 may comprise a variety of peripheral components, such as a wired and/or wireless network adapter 814 connectible to a local area network and/or wide area network; one or more storage components 816, such as a hard disk drive, a solid-state storage device (SSD), a flash memory device, and/or a magnetic and/or optical disk reader.

The computer 704 may comprise a mainboard featuring one or more communication buses 812 that interconnect the processor 810, the memory 802, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 812 may interconnect the computer 704 with at least one other computer. Other components that may optionally be included with the computer 704 (though not shown in the schematic architecture diagram 800 of FIG. 8) include a display; a display adapter, such as a graphical processing unit (GPU); input peripherals, such as a keyboard and/or mouse; and a flash memory device that may store a basic input/output system (BIOS) routine that facilitates booting the computer 704 to a state of readiness.

The computer 704 may operate in various physical enclosures, such as a desktop or tower, and/or may be integrated with a display as an "all-in-one" device. The computer 704 may be mounted horizontally and/or in a cabinet or rack, and/or may simply comprise an interconnected set of components. The computer 704 may comprise a dedicated and/or shared power supply 818 that supplies and/or regulates power for the other components. The computer 704 may provide power to and/or receive power from another computer and/or other devices. The computer 704 may comprise a shared and/or dedicated climate control unit 820 that regulates climate properties, such as temperature, humidity, and/or airflow. Many such computers 704 may be configured and/or adapted to utilize at least a portion of the techniques presented herein.

FIG. 9 presents a schematic architecture diagram 900 of a client device 710 whereupon at least a portion of the techniques presented herein may be implemented. Such a client device 710 may vary widely in configuration or capabilities, in order to provide a variety of functionality to a user such as the user 712. The client device 710 may be provided in a variety of form factors, such as a desktop or tower workstation; an "all-in-one" device integrated with a display 908; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance.

The client device 710 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The client device 710 may comprise memory 901 storing various forms of applications, such as an operating system 903; one or more user applications 902, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 906 connectible to a local area network and/or wide area network; one or more output components, such as a display 908 coupled with a display adapter (optionally including a graphical processing unit (GPU)), a sound adapter coupled with a speaker, and/or a printer; input devices for receiving input from the user, such as a keyboard 911, a mouse, a microphone, a camera, and/or a touch-sensitive component of the display 908; and/or environmental sensors, such as a global positioning system (GPS) receiver 919 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 900 of FIG. 9) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 912 that interconnect the processor 910, the memory 901, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 918 that supplies and/or regulates power for other components, and/or a battery 904 that stores power for use while the client device 710 is not connected to a power source via the power supply 918. The client device 710 may provide power to and/or receive power from other client devices.

Figure 10:
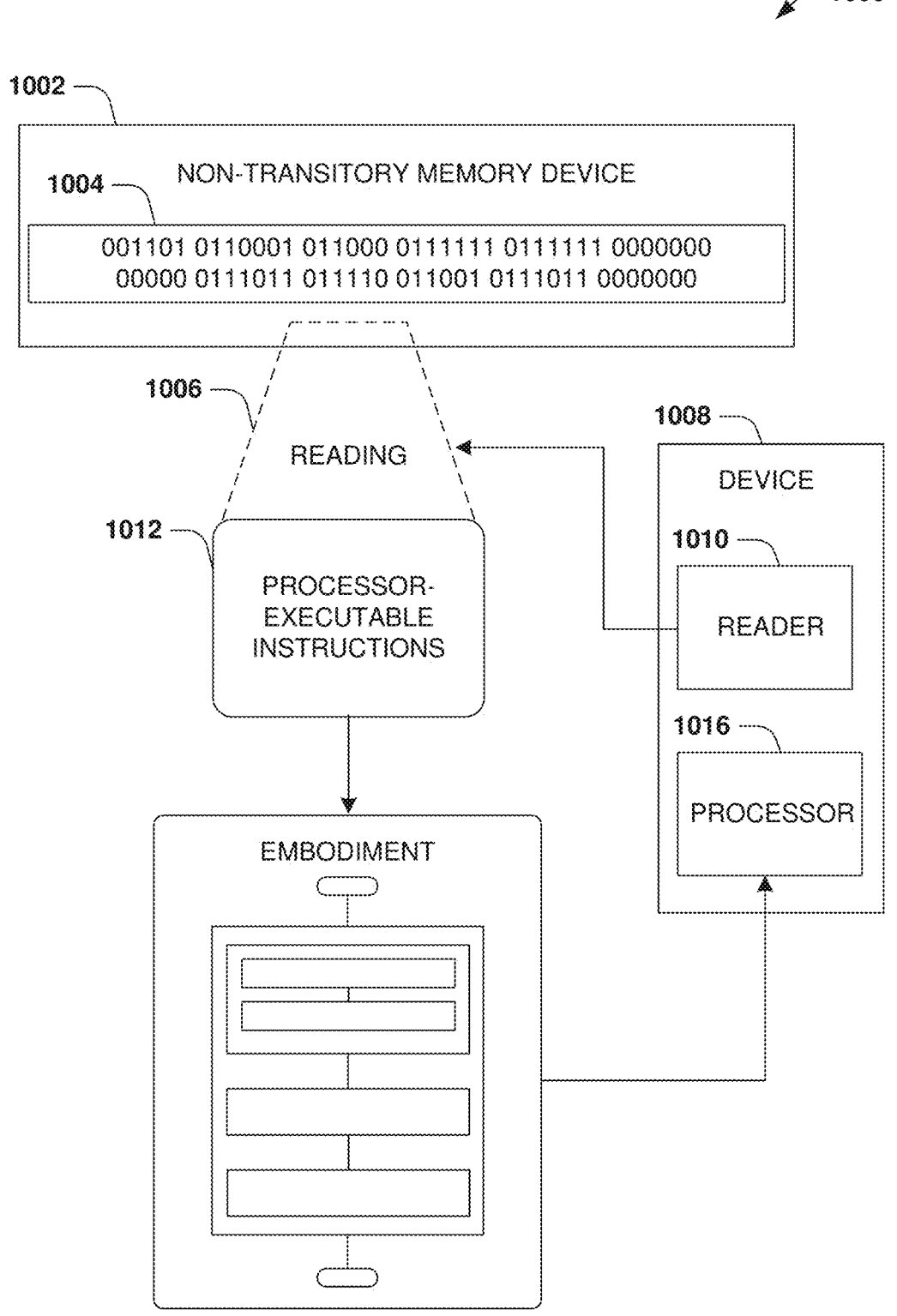
FIG. 10 is an illustration of a scenario featuring an example non-transitory machine readable medium in accordance with one or more of the provisions set forth herein.

FIG. 10 is an illustration of a scenario 1000 involving an example non-transitory machine readable medium 1002. The non-transitory machine readable medium 1002 may comprise processor-executable instructions 1012 that when executed by a processor 1016 cause performance (e.g., by the processor 1016) of at least some of the provisions herein. The non-transitory machine readable medium 1002 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1002 stores computer-readable data 1004 that, when subjected to reading 1006 by a reader 1010 of a device 1008 (e.g., a read head of a hard disk drive, or a read operation invoked on a solid-state storage device), express the processor-executable instructions 1012. In some embodiments, the processor-executable instructions 1012, when executed cause performance of operations, such as at least some of the example method 300 of FIG. 3, for example. In some embodiments, the processor-executable instructions 1012 are configured to cause implementation of a system, such as at least some of the example system 400 of FIG. 4 and/or at least some of the example system 500 of FIG. 5.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed:

1. A method, comprising:

transmitting, by a controller remote to a reconfigurable intelligent surfaces network, a control signal over a communication channel to a reconfigurable intelligent surfaces component for modifying operation of cells of the reconfigurable intelligent surfaces component;

receiving, by the controller, characteristics of signals transmitted through the reconfigurable intelligent surfaces network between devices;

evaluating, by the controller, the characteristics of the signals transmitted through the reconfigurable intelligent surfaces network to generate tuning parameter values to apply to cells of the reconfigurable intelligent surfaces component of the reconfigurable intelligent surfaces network;

transmitting, by the controller, control signals over the communication channel to the reconfigurable intelligent surfaces component for modifying operation of the cells using the tuning parameter values;

at least one of iteratively generating new tuning parameter values or iteratively transmitting new control signals to the reconfigurable intelligent surfaces component until a stopping criteria is satisfied; and in response to the stopping criteria being satisfied, storing a set of current tuning parameter values as stored tuning parameter values.

2. The method of claim 1 wherein the control signals comprise a plurality of cell control frames, wherein a cell control frame, of the plurality of cell control frames, comprises an identifier of the reconfigurable intelligent surfaces component, a voltage level as a tuning parameter value, and a cell identifier of a cell that is to be programmed with the voltage level.

3. The method of claim 1 further comprising:

iteratively generating new tuning parameter values and transmitting other control signals to the reconfigurable intelligent surfaces component until a stopping criteria is satisfied, wherein the stopping criteria corresponds to a determination that an increase in performance by the reconfigurable intelligent surfaces component from a prior iteration to a next iteration of the other control signals is below a threshold.

4. The method of claim 1 further comprising:

generating a new set of tuning parameter values associated with the control signal based upon a seed value.

5. The method of claim 4 further comprising:

receiving updated characteristics corresponding to a signal transmitted through the reconfigurable intelligent surfaces network while the cells are tuned using the new set of tuning parameter values;

evaluating the updated characteristics to determine an updated performance of the reconfigurable intelligent surfaces component; and in response to the updated performance being less than the performance of the reconfigurable intelligent surfaces component while the cells were tuned using the stored tuning parameter values, transmitting a second control signal over the communication channel to the reconfigurable intelligent surfaces component for modifying operation of the cells using the stored tuning parameter values.

6. The method of claim 1, wherein the controller is hosted within a cloud computing environment separate from the reconfigurable intelligent surfaces network, and wherein a first device is a base station and a second device is user equipment.

7. The method of claim 6, wherein the controller evaluates a set of characteristics received from at least one of the base station or the user equipment using machine learning to generate a set of tuning parameter values as voltage levels to apply to the cells of the reconfigurable intelligent surfaces component.

8. The method of claim 1, wherein the control signal is broadcast over the communication channel, and wherein the control signal comprises a plurality of cell control frames associated with a plurality of cells of the reconfigurable intelligent surfaces component.

9. The method of claim 8, wherein a cell control frame, of the plurality of cell control frames, comprises an identifier of the reconfigurable intelligent surfaces component and a voltage level as a tuning parameter value.

10. The method of claim 9, wherein the cell control frame comprises a cell identifier of a cell that is to be programmed with the voltage level.

11. The method of claim 8, wherein a cell control frame, of the plurality of cell control frames, comprises error detection and correction information used by the reconfigurable intelligent surfaces component to validate the cell control frame.

12. The method of claim 1 further comprising:

generating a tuning parameter value to apply to a cell for increasing a signal to interference and noise ratio.

13. The method of claim 1 further comprising:

generating an initial tuning seed;

creating a set of initial tuning parameter values based upon the initial tuning seed; and transmitting a second control signal to the reconfigurable intelligent surfaces component for modifying operation of the cells using the set of initial tuning parameter values.

14. A system, comprising:

a reconfigurable intelligent surfaces component comprising:

a plurality of cells configured to operate based upon tuning parameter values;

a receiver configured to receive a control signal over a wireless communication channel from a controller remote to the reconfigurable intelligent surfaces component, wherein the control signal comprises a set of tuning parameter values generated by the controller utilizing machine learning functionality and characteristics of signals transmitted through a reconfigurable intelligent surfaces network comprising the reconfigurable intelligent surfaces component, wherein the control signal comprises a plurality of cell control frames comprising (i) a first cell control frame comprising an identifier of the reconfigurable intelligent surfaces component, a first voltage level as a first tuning parameter value, and a first cell identifier of a first cell that is to be programmed with the first voltage level and (ii) a second cell control frame comprising the identifier of the reconfigurable intelligent surfaces component, a second voltage level as a second tuning parameter value, and a second cell identifier of a second cell that is to be programmed with the second voltage level; and a tuning component configured to apply the set of tuning parameter values to the plurality of cells to modify operation of the plurality of cells.

15. The system of claim 14, wherein the reconfigurable intelligent surfaces component is configured as a one-way communication device that uses the receiver to receive control signals from the controller over the wireless communication channel implemented as a receive only radio link.

16. The system of claim 15, wherein the tuning component programs the plurality of cells with voltage values specified by the set of tuning parameter values identified by the machine learning functionality of the controller.

17. The system of claim 15, wherein the plurality of cells are configured to propagate a signal from a base station to user equipment over a reconfigurable intelligent surfaces network.

18. The system of claim 14, wherein the tuning component validates the first cell control frame using error detection and correction information within the first cell control frame.

19. The system of claim 18, wherein the tuning component validates the second cell control frame using error detection and correction information within the second cell control frame.

20. A non-transitory computer-readable medium storing instructions that when executed facilitate performance of operations comprising:

receiving, by a controller remote to a reconfigurable intelligent surfaces network, signal characteristics of signals transmitted through the reconfigurable intelligent surfaces network between devices;

evaluating, by the controller, the signal characteristics of the signals transmitted through the reconfigurable intelligent surfaces network to generate tuning parameter values to apply to cells of a reconfigurable intelligent surfaces component of the reconfigurable intelligent surfaces network; and transmitting, by the controller, a plurality of cell control frames over a communication channel to the reconfigurable intelligent surfaces component for modifying operation of the cells using the tuning parameter values, wherein the plurality of cell control frames comprises (i) a first cell control frame comprising an identifier of the reconfigurable intelligent surfaces component, a first voltage level as a first tuning parameter value, and a first cell identifier of a first cell that is to be programmed with the first voltage level and (ii) a second cell control frame comprising the identifier of the reconfigurable intelligent surfaces component, a second voltage level as a second tuning parameter value, and a second cell identifier of a second cell that is to be programmed with the second voltage level.

<div align="center">* * * * *</div>